US011223522B1

(12) United States Patent
Sethi et al.

(10) Patent No.: US 11,223,522 B1
(45) Date of Patent: Jan. 11, 2022

(54) CONTEXT-BASED INTELLIGENT RE-INITIATION OF MICROSERVICES

(71) Applicant: Dell Products L.P., Round Rock, TX (US)

(72) Inventors: Parminder Singh Sethi, Ludhiana (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/150,623

(22) Filed: Jan. 15, 2021

(51) Int. Cl.
*G06F 15/16* (2006.01)
*H04L 12/24* (2006.01)

(52) U.S. Cl.
CPC .............................. *H04L 41/0806* (2013.01)

(58) Field of Classification Search
CPC ...... H04L 51/12; H04L 51/26; H04L 12/1822
USPC ......................................................... 709/227
See application file for complete search history.

(56) References Cited

U.S. PATENT DOCUMENTS

| | | | | |
|---|---|---|---|---|
| 9,842,045 | B2 * | 12/2017 | Heorhiadi | G06F 11/3692 |
| 10,048,830 | B2 * | 8/2018 | Jose | G06F 9/4843 |
| 10,102,111 | B2 * | 10/2018 | Rajagopalan | G06F 11/3672 |
| 10,169,220 | B2 * | 1/2019 | Rajagopalan | G06F 11/3676 |
| 10,313,178 | B2 * | 6/2019 | Kumar | G06F 9/45558 |
| 10,394,663 | B2 * | 8/2019 | Chen | G06F 11/1461 |
| 10,409,713 | B2 * | 9/2019 | Benes | G06F 9/45558 |
| 10,411,947 | B2 * | 9/2019 | Rangasamy | H04L 12/4683 |
| 10,445,086 | B2 * | 10/2019 | Jozsa | G06F 8/60 |
| 10,498,601 | B2 * | 12/2019 | Ahuja | H04L 41/0816 |
| 10,498,608 | B2 * | 12/2019 | Sethi | H04L 43/10 |
| 10,530,840 | B2 * | 1/2020 | Helsley | G06F 11/3409 |
| 10,541,893 | B2 * | 1/2020 | Nainar | H04L 43/026 |
| 10,574,513 | B2 * | 2/2020 | Nagarajan | H04L 43/0805 |
| 10,594,632 | B2 * | 3/2020 | Takahashi | H04L 49/9089 |
| 10,656,929 | B2 * | 5/2020 | Jamjoom | G06F 11/3612 |
| 10,673,708 | B2 * | 6/2020 | Parthasarathy | G06F 11/3428 |
| 10,678,512 | B2 * | 6/2020 | Browning | G06F 8/71 |
| 10,684,868 | B2 * | 6/2020 | Driesen | G06F 9/44505 |

(Continued)

OTHER PUBLICATIONS

Kubernetes, "What is Kubernetes?" https://kubernetes.io/docs/concepts/overview/what-is-kubernetes/, Oct. 22, 2020, 4 pages.

(Continued)

*Primary Examiner* — Alicia Baturay
(74) *Attorney, Agent, or Firm* — Ryan, Mason & Lewis, LLP

(57) ABSTRACT

An apparatus comprises at least one processing device comprising a processor coupled to a memory. The at least one processing device is configured to receive, at a first microservice, context information for a second microservice, the context information characterizing a current state of execution of one or more tasks by the second microservice. The at least one processing device is also configured to detect, by the first microservice, failure of the second microservice. The at least one processing device is further configured to re-initiate, by the first microservice, the second microservice utilizing the received context information for the second microservice. Re-initiating the second microservice utilizing the received context information for the second microservice enables the re-initiated second microservice to continue execution of the one or more tasks from the current state.

20 Claims, 14 Drawing Sheets

(56) References Cited

U.S. PATENT DOCUMENTS

| | | | |
|---|---|---|---|
| 10,719,414 B2* | 7/2020 | Giannetti | G06F 9/485 |
| 10,725,867 B2* | 7/2020 | Giannetti | G06F 11/1441 |
| 10,740,537 B2* | 8/2020 | Chauhan | G06F 40/137 |
| 10,785,122 B2* | 9/2020 | Inamdar | H04L 67/22 |
| 10,791,105 B2* | 9/2020 | Otero | G06F 9/4451 |
| 10,824,981 B2* | 11/2020 | Koutyrine | G06F 11/07 |
| 10,853,159 B1* | 12/2020 | Langley | G06F 11/3055 |
| 10,862,979 B2* | 12/2020 | Deraz | G06Q 10/10 |
| 10,880,248 B2* | 12/2020 | Kapadia | G06F 9/5077 |
| 10,892,942 B2* | 1/2021 | Rangasamy | H04L 43/0817 |
| 10,896,084 B2* | 1/2021 | Bagarolo | G06F 11/0751 |
| 10,931,507 B2* | 2/2021 | Cherunni | G06F 9/5077 |
| 10,936,444 B2* | 3/2021 | Rhodes | G06F 11/1464 |
| 11,016,939 B2* | 5/2021 | Lu | G06F 16/172 |
| 11,036,489 B2* | 6/2021 | Jozsa | G06F 9/455 |
| 11,080,157 B1* | 8/2021 | Roberts | H04L 43/50 |
| 2017/0187785 A1* | 6/2017 | Johnson | H04L 67/10 |
| 2018/0109429 A1* | 4/2018 | Gupta | G06F 3/0481 |
| 2019/0102157 A1* | 4/2019 | Caldato | G06F 9/5083 |
| 2020/0287813 A1* | 9/2020 | Kutch | H04L 43/16 |
| 2020/0409591 A1* | 12/2020 | Kulli | G06F 3/0683 |
| 2021/0067512 A1* | 3/2021 | Polepalli Yeshwanth | H04L 41/28 |
| 2021/0157686 A1* | 5/2021 | Rhodes | H04L 67/16 |
| 2021/0208961 A1* | 7/2021 | Dutta | G06F 11/0751 |
| 2021/0227048 A1* | 7/2021 | Raman | G06F 9/445 |
| 2021/0234930 A1* | 7/2021 | Dinh | H04L 67/10 |
| 2021/0271489 A1* | 9/2021 | Singhal | G06F 9/4403 |

OTHER PUBLICATIONS

Vmware, Inc. "VMware Tanzu," Solution Brief, 2021, 3 pages.
Spring, "Microservices," https://spring.io/microservices, Accessed Jan. 14, 2021, 4 pages.
S. Sugob, "The Twelve-Factor App—a Successful Microservices Guideline," https://medium.com/hiredevops-org/the-twelve-factor-app-a-successful-microservices-guideline-497f45aac506, Feb. 28, 2019, 7 pages.
yaml.org, "The Official YAML Web Site," https://yaml.org, Accessed Jan. 14, 2021, 2 pages.

* cited by examiner

```
package com.telemetry;

@SpringBootApplication
@EnableTelemetryProcessing
@EnableAttachData
@EnableTelemetryCommunication
public class ContextAwareOrchestratorMicroservice{
    StringApplication.run(ContextAwareOrchestratorMicroservice.class, args)
}
```

FIG. 8

```
@Target(CLASS)
Retention(RUNTME)
public @interface EnableAttachData {
    public boolean enabled() default true;
}

@Target(CLASS)
Retention(RUNTME)
public @interface EnableTelemetryCommunication {
    public boolean enabled() default true;
}
```

FIG. 9

```
const express = require("express")
const app = express()
app.use(express.jason())

app.POST("/", (req, res) =>{ const message = req.body.Telemetry
//Store this in the "Attached Data"
fetch ("http://localhost:10050",{
    method = "POST"
    headers :{
        "content-type":"application/json"
    },
    body:message
})
})

app.listen(10012 () => console.log("Listening to the port 10012"))
```

```
public boolean EnableTelemetryCommunication{
    while(datastorehasnewerror == true)
    Socket clientSocket = new Socket("localhost", 10012);
    PrintWriter out = new PrintWriter(clientSocket.getOutputStream(), true);
    BufferedReader in = new BufferedReader(new
InputStreamReader(clientSocket.getInputStream()));
}
```

```
server:
  port: 5678
spring:
  application:
    name: TelemetryProcessing

TelemetryProcessing:
  port: 8000
  health-uri: http://localhost:8000/health.json AttachedData:
  port: 8002
  health-uri: http://localhost:8002/health.json TelemetryCommunication
  incomingPort: 8004
  outgoingPort:8005
  health-uri: http://localhost:8004/health.json
```

FIG. 12

CONTEXT-BASED INTELLIGENT RE-INITIATION OF MICROSERVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing, and more particularly to microservices in information processing systems.

BACKGROUND

Information processing systems increasingly utilize reconfigurable virtual resources to meet changing user needs in an efficient, flexible and cost-effective manner. For example, cloud computing and storage systems implemented using virtual resources such as virtual machines have been widely adopted. Other virtual resources now coming into widespread use in information processing systems include Linux containers. Such containers may be used to provide at least a portion of the virtualization infrastructure of a given cloud-based information processing system. However, significant challenges can arise in the management of services in cloud-based information processing systems.

SUMMARY

Illustrative embodiments of the present disclosure provide techniques for context-based intelligent re-initiation of microservices.

In one embodiment, an apparatus comprises at least one processing device comprising a processor coupled to a memory. The at least one processing device is configured to perform the steps of receiving, at a first microservice, context information for a second microservice, the context information characterizing a current state of execution of one or more tasks by the second microservice, and detecting, by the first microservice, failure of the second microservice. The at least one processing device is further configured to perform the step of re-initiating, by the first microservice, the second microservice utilizing the received context information for the second microservice. Re-initiating the second microservice utilizing the received context information for the second microservice enables the re-initiated second microservice to continue execution of the one or more tasks from the current state.

These and other illustrative embodiments include, without limitation, methods, apparatus, networks, systems and processor-readable storage media.

BRIEF DESCRIPTION OF THE DRAWINGS

FIG. 8 shows pseudocode for microservice initiation in an illustrative embodiment.

FIG. 9 shows pseudocode for custom annotations for microservice initiation in an illustrative embodiment.

FIG. 12 shows an example configuration of properties for a participating microservice in an illustrative embodiment.

DETAILED DESCRIPTION

Figure 1:
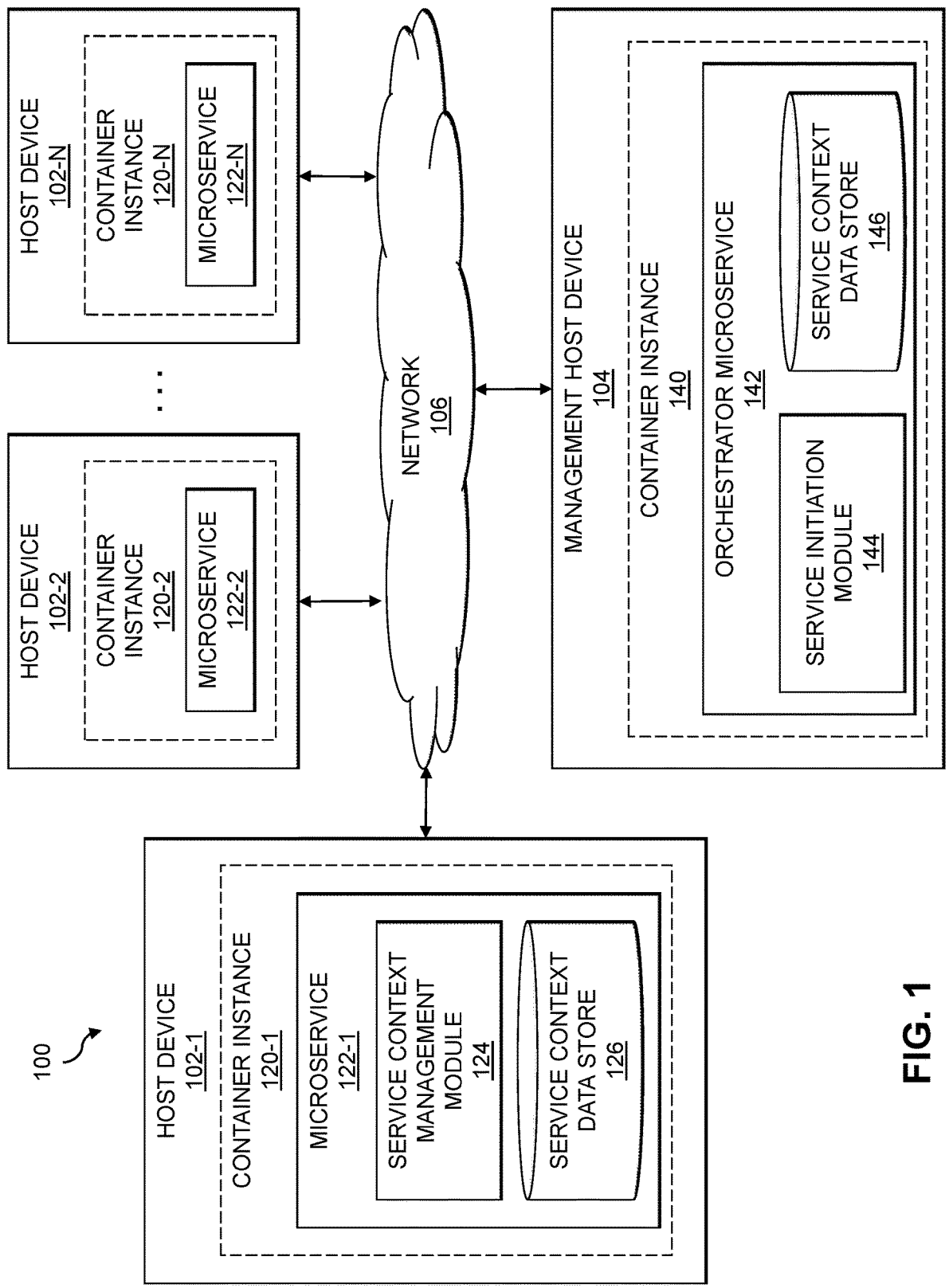
FIG. 1 is a block diagram of an information processing system for context-based intelligent re-initiation of microservices in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Software architecture may be designed in various ways. In some architectures, software may provide a number of functions in the form of a single, monolithic application. A "monolithic" application refers to a single-tiered, tightly-coupled software application in which various elements of the software architecture (e.g., a user interface, database access, processing logic, etc.) are combined into a single program, usually on a single platform. In software engineering, a monolithic application describes a software application that is designed without modularity. In general, modularity of software elements in a software architecture is desirable, as modularity supports reuse of portions of application logic while also enabling efficient maintenance and development (e.g., by enabling repair and replacement of parts of an application without requiring upgrading the entire application).

Monolithic applications may suffer from disadvantages relating to innovation, manageability, resiliency and scalability, particularly in computing environments such as cloud computing environments, datacenters, and converged infrastructure. As an alternative to such monolithic applications, some software architectures provide different functions in the form of microservices. In a microservice architecture, a single application is developed as a suite of small microservices. A microservice can run on its own process and communicate with other systems or services through a lightweight mechanism, such as a hypertext transport protocol (HTTP) resource application programming interface (API) or communication API provided by an external system. Microservices in some embodiments are assumed to be independently deployable using fully automated deployment mechanisms.

In some embodiments, microservices are small, independent and composable services that can be accessed through Representational State Transfer (RESTful) APIs. Thus, a single monolithic application may be broken down into separate and independent microservices for discrete functions, providing potential benefits in innovation, manageability, resiliency and scalability. Innovation benefits may be provided through the ability to develop and deploy new versions of microservices more rapidly as compared to a single monolithic application. Manageability benefits may be realized as the code used is smaller and thus easier to understand, facilitating changes and deployments. Resiliency benefits may be realized as functionality may be distributed across multiple microservices, such that failure or downtime of one microservice does not result in loss of functionality provided by other microservices. Scalability benefits may be realized in that microservices can be deployed and scaled independently of one another.

Microservices-based software architectural design structures an application as a collection of loosely coupled services. Microservices-based software architectures may be viewed as a variant of a service-oriented architecture that focuses on fine-grained services, lightweight protocols, etc. A microservices architecture enables individual microservices to be deployed and scaled independently, such as via software containers. Individual microservices can be worked on in parallel by different teams, may be built in different programming languages, and have continuous delivery and deployment flows. As development moves toward cloud-native approaches, it is desired to decompose, disintegrate or otherwise separate existing monolithic applications into microservices. Advantageously, microservices allow software developers of an enterprise to work independently and communicate together. Thus, an enterprise system can achieve better efficiency and resiliency with microservices as compared with monolithic applications, while providing similar or better results.

FIG. 1 shows an information processing system 100 configured in accordance with an illustrative embodiment for context-based intelligent re-initiation of microservices. The information processing system 100 comprises one or more host devices 102-1, 102-2, . . . 102-N (collectively, host devices 102) and a management host device 104 that communicate over a network 106.

The host devices 102 and management host device 104 illustratively comprise respective computers, servers or other types of processing devices capable of communicating with one another via the network 104. For example, at least a subset of the host devices 102 and the management host device 104 may be implemented as respective virtual machines of a compute services platform or other type of processing platform. The host devices 102 and the management host device 104 in such an arrangement illustratively provide compute services such as execution of one or more applications on behalf of each of one or more users associated with respective ones of the host devices 102 and the management host device 104.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

In the information processing system 100 of FIG. 1, the host devices 102-1, 102-2, . . . 102-N are assumed to run respective software container instances 120-1, 120-2, . . . 120-N (collectively, software container instances 120) in which respective microservices 122-1, 122-2, . . . 122-N (collectively, microservices 122) execute. It should be appreciated that the software container instances 120 (also referred to herein as container instances 120 or containers 120) may be optional, and that the microservices 122 may run or execute directly on the host devices 102, or otherwise outside of the container instances 120 running on the host devices 102. The management host device 104 runs or operates a container instance 140 (e.g., providing a container orchestration engine for a container environment including the container instances 120). An orchestrator microservice 142 executes on the container instance 140. Although shown as being executed or run within the container instance 140 in FIG. 1, it should be appreciated that the orchestrator microservice 142 may run directly on the management host device 104 or otherwise outside of the container instance 140 running on the management host device 104.

While FIG. 1 shows an example wherein each of the host devices 102 and management host device 104 runs a single container instance, embodiments are not limited to this arrangement. Instead, each of the host devices 102 and/or management host device 104 may run multiple container instances, including embodiments wherein all of the container instances (e.g., 120 and 140) run on the same host device (e.g., one of the host devices 102 or the management host device 104). In addition, while each of the container instances 120, 140 is shown in FIG. 1 as running or executing just a single one of the microservices 122, 142, one or more of the containers instances 120, 140 may run multiple microservices. This includes arrangements where a single one of the container instances 120, 140 runs both the orchestrator microservice 142 and one or more of the microservices 122, where a single one of the container instances 120 runs multiple different microservices 122, etc. Further, as noted above, the microservices 122, 142 may run or execute directly on or otherwise outside of the container instances 120, 140 on any combination of the host devices 102 and management host device 104.

As shown in FIG. 1, the microservice 122-1 comprises a service context management module 124 and a service context data store 126. The service context management module 124 is configured to monitor a context of the microservice 122-1, and to store such context in the service context data store 126. The service context data store 126 may utilize storage of the host device 102-1 (e.g., one or more storage devices of the host device 102-1, storage volumes on one or more storage arrays accessible to the host device 102-1 over network 106, etc.). The context of the microservice 122-1 may include, but is not limited to, input data, state (e.g., status of execution of one or more tasks by the microservice 122-1), error codes, etc. The service context management module 124 is also configured to transmit the context of the microservice 122-1 to the orchestrator microservice 142. Although not explicitly shown in FIG. 1 for clarity of illustration, it is assumed that other ones of the microservices 122-2 through 122-N are similarly configured with respective service context management modules and service context data stores, such that the other ones of the microservices 122-2 through 122-N may transmit their associated service context information to the orchestrator microservice 142.

The orchestrator microservice 142 includes a service initiation module 144 and a service context data store 146. The service context data store 146 is configured to store context information for the microservice 122-1 (e.g., that is transmitted by the service context management module 124). The service context data store 126 may utilize storage of the management host device 104 (e.g., one or more storage devices of the management host device 104, storage volumes on one or more storage arrays accessible to the management host device 104 over network 106, etc.). If the orchestrator microservice 142 detects failure of the microservice 122-1, the service initiator module 144 is configured to retrieve the stored context information for the microservice 122-1 from the service context data store 146, and utilizes the retrieved context information to intelligently re-initiate the microservice 122-1 from the point of failure. In this way, the re-initiated microservice 122-1 may pick up where it left off in processing instead of clearing out data and starting tasks from the beginning.

At least portions of the functionality of the service context management module 124 and the service initiation module 144 may be implemented at least in part in the form of software that is stored in memory and executed by a processor.

The host devices 102 and management host device 104 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the management host device 104 (or one or more components thereof such as the container instances 120, 140, microservices 122, 142, service context management module 124, service initiation module 144, service context data stores 126, 146) may be implemented on respective distinct processing platforms, although numerous other arrangements are possible. For example, in some embodiments at least portions of one or more of the host devices 102 and the management host device 104 are implemented on the same processing platform. The management host device 104 can therefore be implemented at least in part within at least one processing platform that implements at least a subset of the host devices 102.

The network 106 may be implemented using multiple networks of different types. For example, the network 106 may comprise a portion of a global computer network such as the Internet, although other types of networks can be part of the network 106 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 106 in some embodiments therefore comprises combinations of multiple different types of networks each comprising processing devices configured to communicate using Internet Protocol (IP) or other related communication protocols.

The host devices 102 and the management host device 104 in some embodiments may be implemented as part of a cloud-based system. The host devices 102 and the management host device 104 can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks including network 106.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 and the management host device 104 are possible, in which certain ones of the host devices 102 reside in one data center in a first geographic location while other ones of the host devices 102 reside in one or more other data centers in at least a second geographic location that is potentially remote from the first geographic location. The management host device 104 may be implemented at least in part in the first geographic location, the second geographic location, and one or more other geographic locations. Thus, it is possible in some implementations of the system 100 for different ones of the host devices 102 and the management host device 104 to reside in different data centers.

Numerous other distributed implementations of the host devices 102 and the management host device 104 are possible. Accordingly, the host devices 102 and the management host device 104 can also be implemented in a distributed manner across multiple data centers.

Additional examples of processing platforms utilized to implement portions of the system 100 in illustrative embodiments will be described in more detail below in conjunction with FIGS. 13 and 14.

It is to be understood that the particular set of elements shown in FIG. 1 for context-based intelligent re-initiation of microservices is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for context-based intelligent re-initiation of microservices will now be described in more detail with reference to the flow diagram of FIG. 2. It is to be understood that this particular process is only an example, and that additional or alternative processes for context-based intelligent re-initiation of microservices may be used in other embodiments.

In this embodiment, the process includes steps 200 through 204. These steps are assumed to be performed by the microservices 122-1 and 142 utilizing the service context management module 124, the service initiation module 144, and the service context data stores 126, 146. The process begins with step 200, receiving, at a first microservice (e.g., the orchestrator microservice 142), context information for a second microservice (e.g., microservice 122-1). The context information characterizing a current state of execution of one or more tasks by the second microservice. In some embodiments, the second microservice (e.g., microservice 122-1) comprises one of a set of two or more participating microservices (e.g., the microservice 122-1 and one or more of the microservices 122-2 through 122-N) in a microservices execution chain in a container environment.

The first microservice may comprise an attached data store (e.g., service context data store 146), where step 200 may further include storing the context information for the second microservice in the attached data store. The context information for the second microservice may be stored in the attached data store as a serialized object file, such as a serialized object file that utilizes a JavaScript Object Notation (JSON) format. The first microservice may be configured to implement a listener on at least a first port for receiving context information from the second microservice, and to implement a sender on at least a second port for posting the context information received from the second microservice to the attached data store. The attached data store may comprise an embedded file system of the first microservice, the context information for the second microservice being stored in the attached data store in a serialized data format in one or more comma separated values.

The context information for the second microservice may comprise input data for the one or more tasks to be executed by the second microservice, a given one of two or more stages at which execution of the second microservice failed, and an error code indicating a type of failure of the second microservice. The context information for the second microservice may be received in step 200 as part of a given heartbeat message sent from the second microservice to the first microservice.

Figure 2:
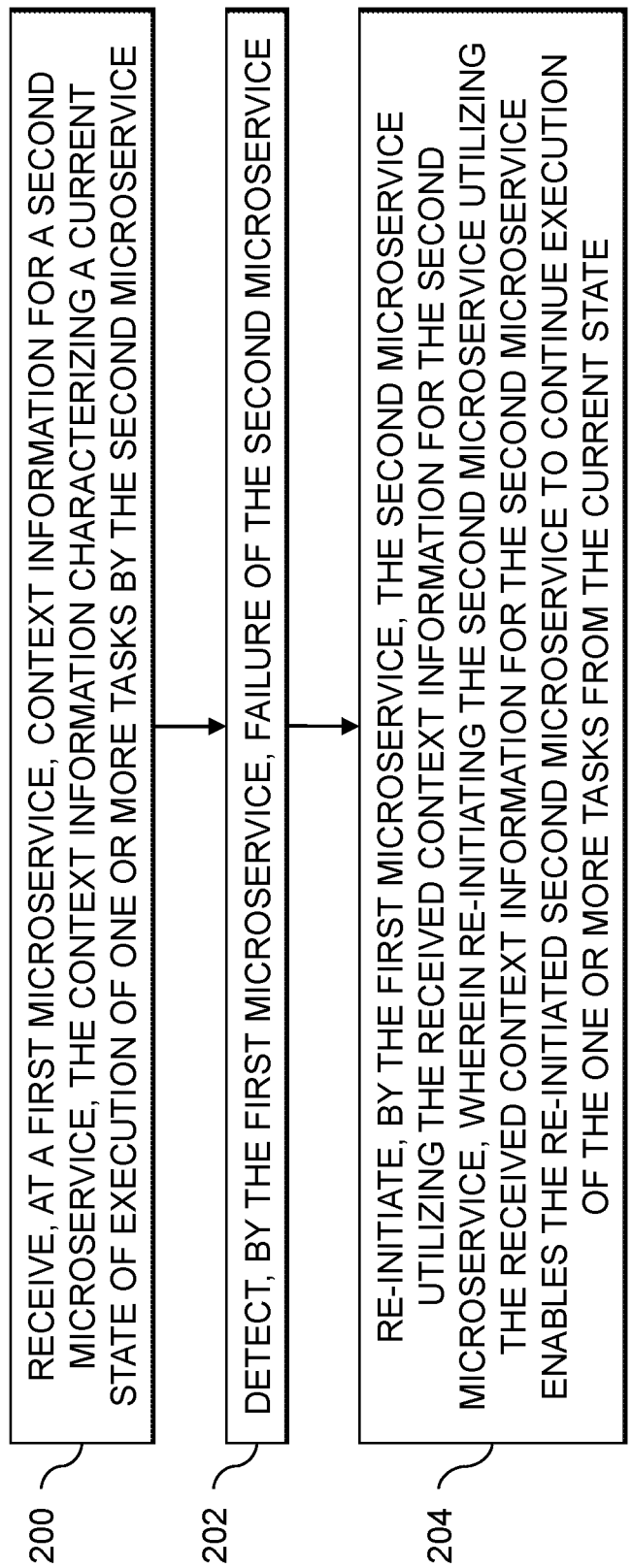
FIG. 2 is a flow diagram of an exemplary process for context-based intelligent re-initiation of microservices in an illustrative embodiment.

The FIG. 2 process continues with step 202, detecting, by the first microservice, failure of the second microservice. In step 204, the first microservice re-initiates the second microservice utilizing the received context information for the second microservice. Re-initiating the second microservice utilizing the received context information for the second microservice enables the re-initiated second microservice to continue execution of the one or more tasks from the current state. For example, step 204 may include directing the re-initiated second microservice to being the one or more tasks from the current state.

The one or more tasks of the second microservice may be executed in two or more stages in a designated order, and the context information characterizing the current state of execution of the one or more tasks by the second microservice comprises an indication of a most recent one of the two or more stages successfully executed by the second microservice. Step 204 may thus include enabling or directing the re-initiated second microservice to continue execution of the one or more tasks from a given one of the two or more stages following the most recent one of the two or more stages successfully executed by the second microservice.

In some embodiments, the second microservice is implemented within a given software container instance (e.g., container instance 120-1). Step 202 may include detecting failure of the given software container instance, and step 204 may include re-initializing the given software container instance.

As described above, the concept of microservices is based on service-oriented software development wherein a software application program (application) is created as a set of loosely-coupled services. Microservices are growing in usage, especially with container-based approaches such as, by way of example only, Kubernetes and Tansu. However, developers have found it difficult to efficiently coordinate these microservices. Microservices may be coordinated in different ways, including (i) reactive-based coordination and (ii) orchestration-based coordination. In reactive-based (also known as choreography) coordination, each microservice decides which service to be called, while in orchestration-based coordination an orchestration controller (e.g., which may be implemented as an orchestrator microservice) or some other centralized system orchestrates multiple microservices using a pre-defined configuration in a database or some other data store.

Figure 3:
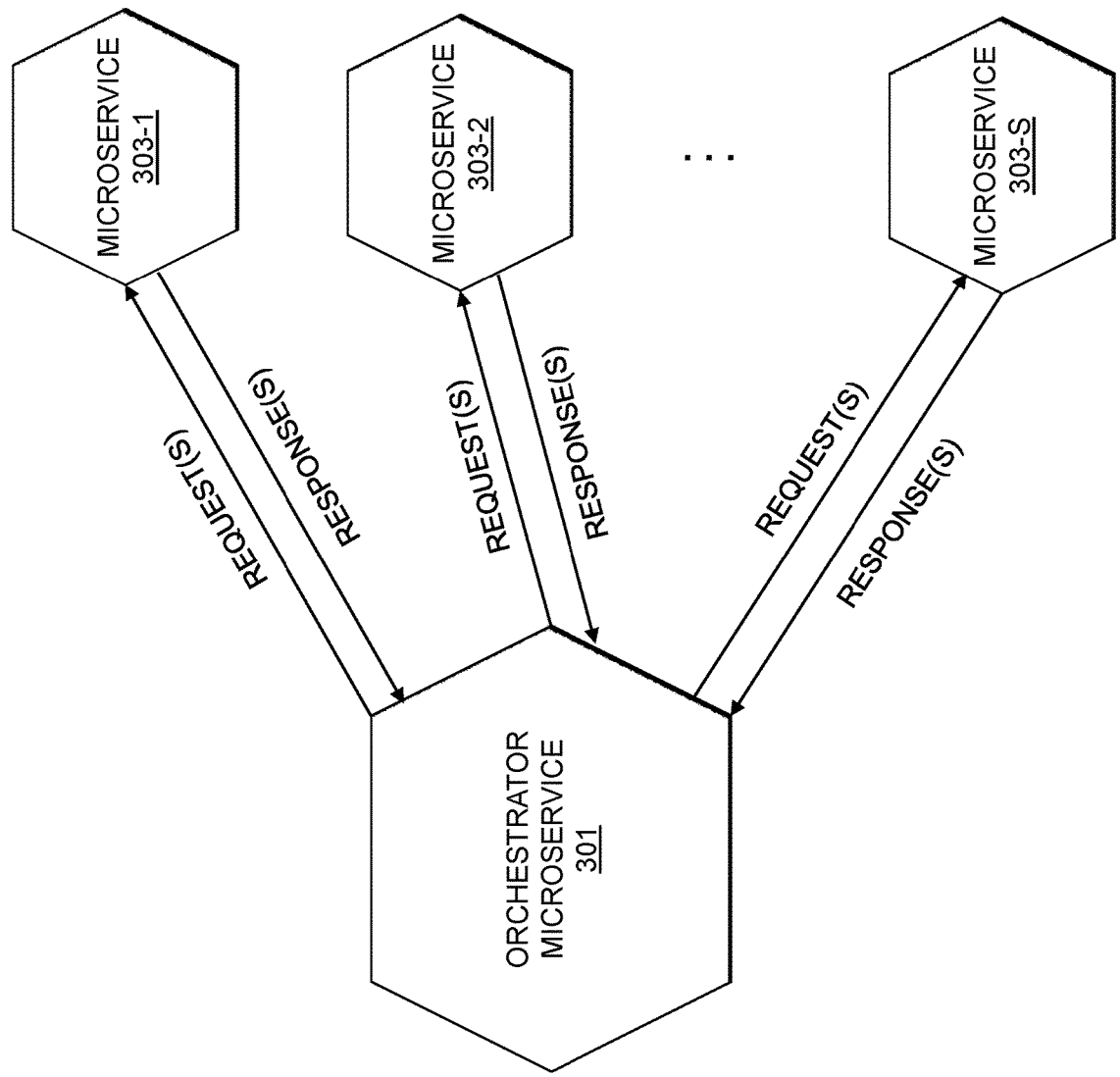
FIG. 3 shows orchestration-based microservices coordination in an illustrative embodiment.

Further, in orchestration-based coordination, microservices send "heartbeat" messages to the orchestration controller. Heartbeat messages may be provided from microservices to the orchestration controller at specified time intervals. When a microservice fails for some reason and the orchestration controller does not receive any heartbeat message in an expected interval of time, the orchestration controller may re-initiate the microservice that failed. Microservices are typically stateless and thus the re-initiated microservice will not have any previous context of its functioning/failures. FIG. 3 shows an example of orchestration-based microservices coordination, where an orchestrator microservice 301 exchanges requests and responses with a set of microservices 303-1, 303-2, . . . 303-S (collectively, microservices 303). Such requests and responses may include the above-described heartbeat messages.

Figure 4:
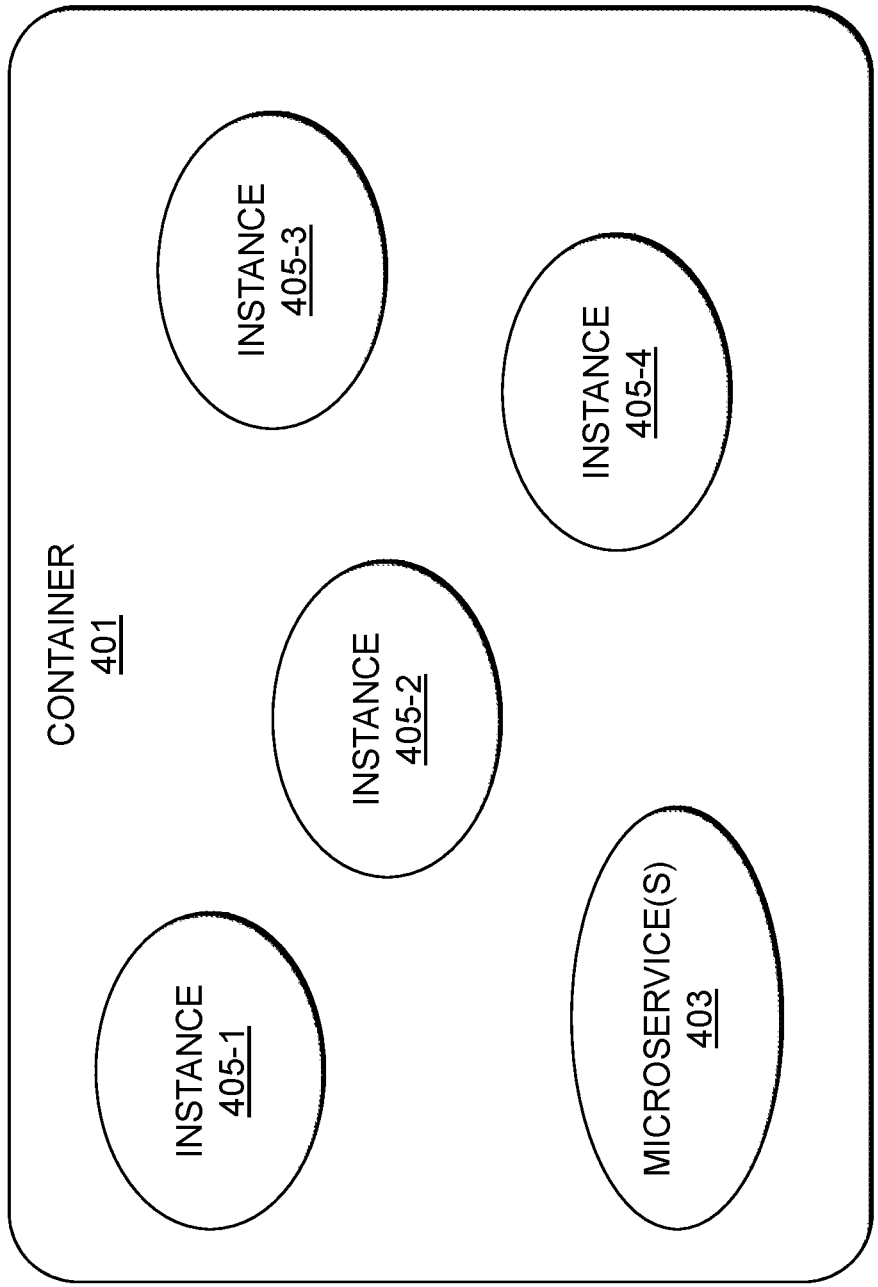
FIG. 4 shows container-based service coordination in an illustrative embodiment.

In the case of a container-based orchestration wherein multiple services are executing as part of a container, when the container does not receive the heartbeat message from a given service, the controller will typically re-initiate the service from the beginning of the service (re-instantiate), thus losing any processing done by the service prior to the re-initiation. The controller may also need to roll back all changes the service has made prior to the time of failure. This is very inefficient and causes extra processing overhead. FIG. 4 shows an example of such container-based orchestration, in which a container 401 runs one or more microservices 403 and instances 405 (405-1 through 405-4).

Illustrative embodiments provide techniques for improved microservice management. For example, illustrative embodiments provide methodologies to enable a given microservice to be made aware of states of the given microservice by persisting context information. The persisted context information may include, for example, incoming attributes, a stage at which the microservice failed, error codes, etc. The persisted context information is transmitted to an orchestration controller. When the orchestration controller has to re-initiate the given microservice due to some failure of the given microservice, the controller uses the previously transmitted context information to recreate an execution context for the given microservice and re-initiate the given microservice to start its job from where it stopped rather than start from the beginning. In some embodiments, the orchestration controller itself is a microservice (e.g., an orchestrator microservice).

As discussed above, microservices may be designed to be "stateless" which is applicable when using reactive-based or choreography coordination. Reactive-based or choreography coordination has considerable complexity, and thus some systems are adopting a hybrid mode that combines orchestration and reactive-based microservices coordination. When there is an orchestration controller governing execution of a set of participating microservices, the orchestration controller (which may be implemented as an orchestrator microservice) being stateless creates a lot of overhead.

Since the orchestration controller or orchestrator microservice does not know what participating microservices have executed, or why participating microservices fail, the orchestrator microservice is unable to perform intelligent restart or re-initiation of the participating microservices. In other words, restarted or re-initiated participating microservices do not know where to start in processing. Sometimes, when a given participating microservice goes down, it may have already done part of the work it was assigned to do. Thus, when re-initiated the given participating microservice only needs to do the rest of the work it was assigned to do. Illustrative embodiments provide techniques for participating microservices to send service context information (also referred to as telemetry data) to the orchestrator microservice, to allow the orchestrator microservice to more intelligently restart or re-initialize participating microservices when such participating microservices fail or go down. The telemetry data may include the state of the participating microservices, error codes or other reasons for failure of participating microservices, etc. Using such telemetry data, the orchestrator microservice can understand the reason behind failures of participating microservices. This enables an end-to-end path for analyzing the past failures. In a container environment, a microservice may crash a container and need to be re-initialized. Such re-initialization of the container (and associated microservices) is also not intelligent, because the container (and associated microservices) do not have knowledge of how and when it crashed. For simplicity of description below, it is assumed that an orchestrator microservice is utilized. It should be appreciated, however, that the functionality of the orchestrator microservice may be performed by another type of orchestrator controller, a container, etc.

Consider an implementation where an orchestrator microservice performs orchestration for a set of participating microservices for a task. Such participating microservices can send "heartbeat" messages to let the orchestrator microservice know if the participating microservices are alive or not. Similarly, in a container implementation if a service is failed or crashed the container misses the "heartbeat" of that service and the container can re-instantiate that service. When a given microservice goes down, it may be in the middle of some work for a given task. The orchestrator microservice or container, however, will lose all context of the given microservice when the given microservice goes down. Thus, the given microservice needs to be re-instantiated from the start of the given task.

Consider, as an example, an "employee" microservice whose job or task is to update an employee summary and update employee details. The orchestrator microservice calls the employee microservice, and passes relevant details as input. Assume that the employee microservice updates the employee summary, but crashes prior to updating the employee details. The orchestrator microservice will then re-instantiate the employee microservice and re-execute the task. Since the employee summary has already been updated, an error may be returned. Thus, before the orchestrator microservice can re-initiate the employee microservice, the orchestrator microservice may need to roll back all the changes the employee microservice previously made at the time of failure. Using the techniques described herein, the employee microservice is made self-aware of the different states that it goes through during its task, such as by persisting incoming attributes (e.g., employee identifier (ID), employee name, etc.), stages (e.g., updating employee summary, updated employee summary, updating employee details, updated employee details, etc.), and error codes (e.g., for the last transaction). The employee microservice transmits such details as telemetry data to the orchestrator microservice. When the orchestrator microservice re-initiates the employee microservice, the details from the received telemetry data are used to re-create the context and intelligently re-initiate the employee microservice to start its job or task from where it stopped (e.g., the re-initiated employee microservice will only update the employee details as the employee summary update was completed successfully) rather than from the beginning of the job or task.

Figure 5:
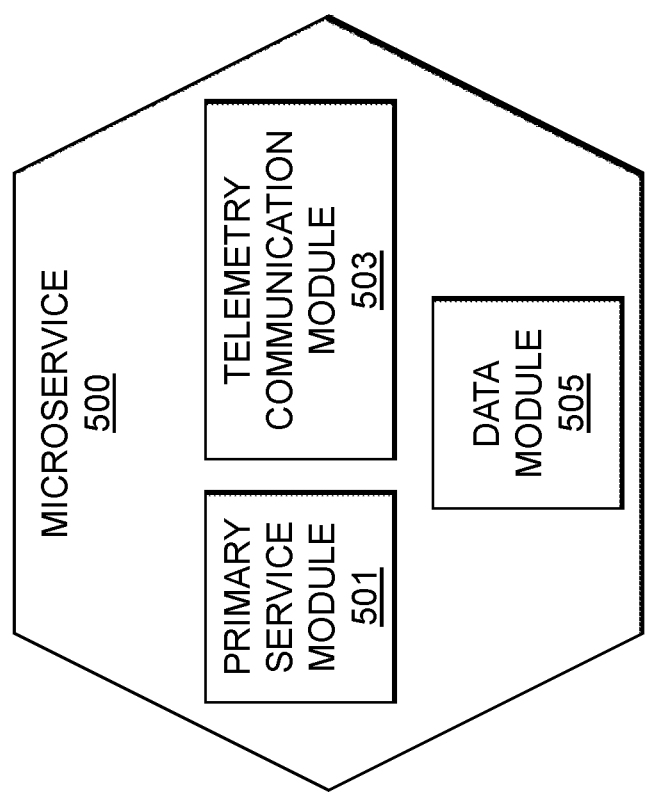
FIG. 5 shows a microservice configured to store status information in an illustrative embodiment.

Conventional microservice designs do not enable a microservice to have the capability to store data by itself. Instead, the microservice needs to use a remote database (DB) to store data. Illustrative embodiments enable data storage as part of a microservice. FIG. 5 shows an example implementation of a microservice 500, which includes a primary service module 501, a telemetry communication module 503, and a data module 505. The primary service module 501 may be configured to perform primary tasks of the microservice 500. In the example "employee" microservice described, such primary tasks may include updating the employee summary and employee details. The primary service module 501 also provides status information (e.g., current state of the primary tasks such as input data, stages of the primary tasks, error codes for latest transactions, etc.) for storage by the data module 505. The telemetry communication module 503 is configured to provide such status information in the form of telemetry data or service context that is provided in "heartbeat" messages to an orchestrator. The concept of enabling data storage as part of the microservice 500 may also be referred to herein as a "side car" to the microservice 500. The data module 505 in the microservice 500 may implement a .ser file store (e.g., an object saved using serialization). As noted above, the data persisted in the .ser file store may include input data or incoming attributes, stages of the primary tasks of the microservice 500, error codes encountered during the primary tasks of the microservice 500 (e.g., for latest transactions only), etc. Such "side car" reference data will go every time the microservice instance goes. When the microservice 500 instantiates data (e.g., for primary tasks executed by the primary service module 501), it is attached (e.g., by the data module 505) similar to the "side car" data to the primary service module 501. When the primary service is down or fails, its data is still persisted in the .ser file by the data module 505. Thus, when the microservice 500 is re-instantiated the instance will be attached to the data again by the data module 505.

Figure 6:
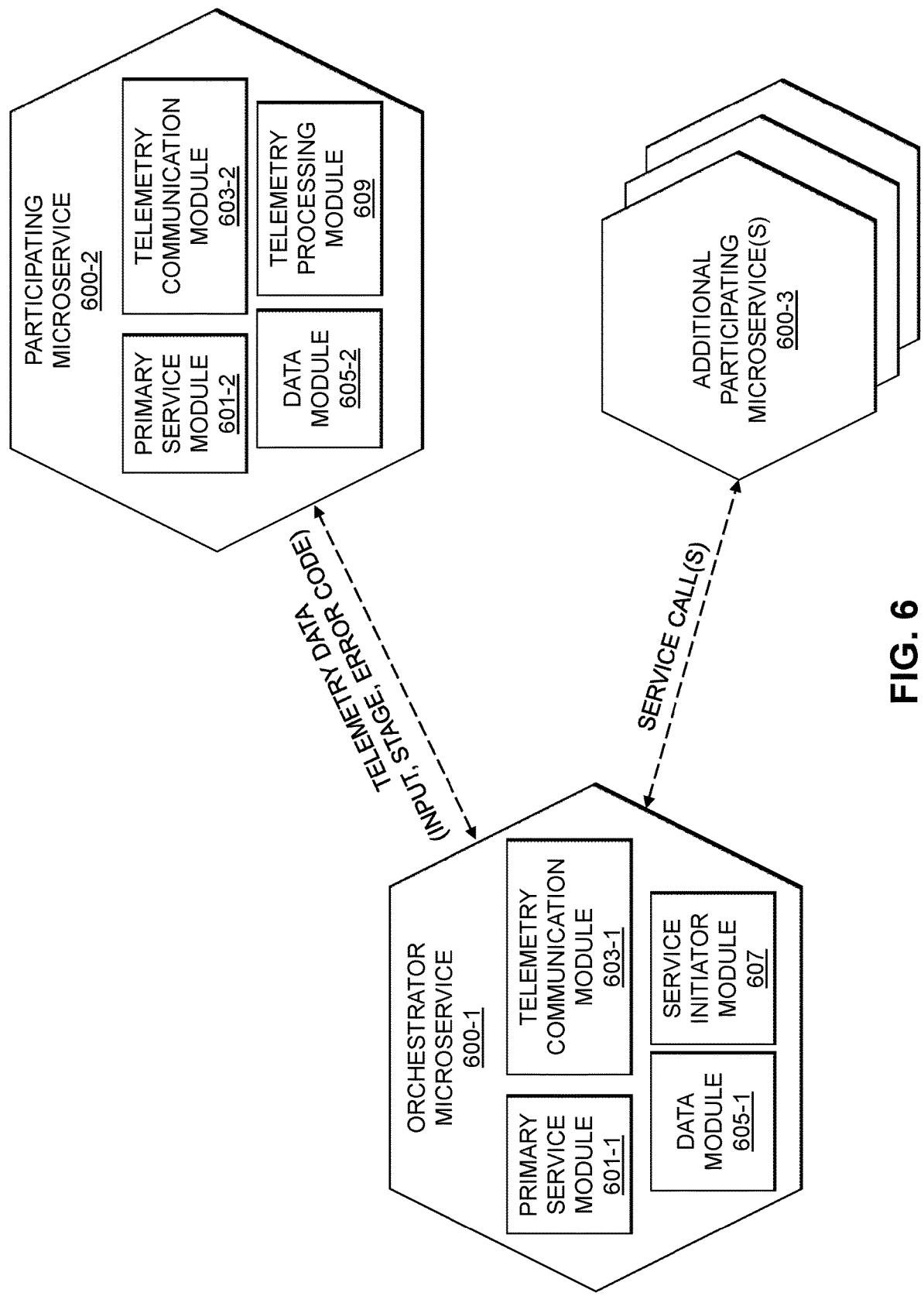
FIG. 6 shows communication between an orchestrator microservice and multiple participating microservices in an illustrative embodiment.

FIG. 6 shows an information processing system environment including an orchestrator microservice 600-1, a participating microservice 600-2, and one or more additional participating microservices 600-3. The orchestrator microservice 600-1 includes a primary service module 601-1, telemetry communication module 603-1, data module 605-1 and service initiator module 607. The participating microservice 600-2 includes a primary service module 601-2, telemetry communication module 603-2, data module 605-2 and a telemetry processing module 609. The primary service modules 601-1 and 601-2, telemetry communication modules 603-1 and 603-2, and data modules 605-1 and 605-2 may provide functionality similar to that described above with respect to the primary service module 501, telemetry communication module 503 and data module 505. Although not explicitly shown, one or more of the additional participating microservices 600-3 may each be configured with a respective primary service module, telemetry communication module, data module and telemetry processing module.

The information processing system environment of FIG. 6 introduces the concept of inter-microservice context information sharing. In conventional microservice architectures, communication between microservices is only actual microservice calls (e.g., "business calls"). In other words, there is no transfer of microservice context data between microservices. FIG. 6 illustrates transfer of microservice context data (also referred to as telemetry data) between the participating microservice 600-2 and the orchestrator microservice 600-1. Such telemetry data may include input data (incoming attributes), stages of microservice task execution, error codes, etc. This enables the orchestrator microservice 600-1 to use all or part of this context information to restart the participating microservice 600-2 (e.g., following failure of the participating microservice 600-2) at the point where the participating microservice 600-2 failed rather than at the beginning of processing again.

As shown in FIG. 6, the participating microservice 600-2 includes the telemetry processing module 609 (e.g., providing an implementation of a "side car" for the participating microservice 600-2, which together with the telemetry communication module 603-2 provides a built-in sender and receiver of telemetry data). At the time when an error occurs in processing by the primary service module 601-2, the telemetry processing module 609 and telemetry communication module 603-2 may still be in good health. The telemetry processing module 609 can thus take the microservice context information data attached via the data module 605-2, and provides such microservice context information as telemetry data to the orchestrator microservice 600-1 utilizing the telemetry communication module 603-2. At the orchestrator microservice 600-1, the telemetry communication module 603-1 will provide the received microservice context information to its data module 605-1 for storage therein.

As the orchestrator microservice 600-1 now has the context information of the failure of the participating microservice 600-2, it can re-initiate the participating microservice 600-2 to start from where it failed (e.g., rather than the beginning of processing). The orchestrator microservice 600-1 will utilize the service initiator module 607 to do so. The service initiator module 607 will retrieve the context information for the failed participating microservice 600-2 from its data module 605-1, and use such information when re-initiating the participating microservice 600-2.

Consider an example scenario, where the orchestrator microservice 600-1 is used to orchestrate a series of microservices (e.g., including the participating microservice 600-2 and the one or more additional participating microservice 600-3). Continuing with the example above, assume that the series of microservices includes a microservices chain including a "quote" microservice "order" microservice "order validation" microservice "employee" microservice.

In a conventional approach, if a microservice in the chain is failing, orchestration will start from the beginning again (e.g., from the quote microservice). Even if an external log DB is used to keep track of which microservice in the chain is currently executing, orchestration would still restart from the beginning of that microservice in the chain (rather than from the point at which processing within that microservice completed prior to failure). Consider, as an example, that the employee microservice failed, and at the point of failure its associated context indicates that the employee summary is already updated, and thus only the employee details need to be updated. Using the techniques described herein, the orchestrator microservice 600-1 knows the context of the failure of the participating microservice 600-2 (e.g., the stage of failure of the employee microservice) and can thus more intelligently re-initiate the participating microservice 600-2. This advantageously saves computing resources, as duplicate processing is avoided.

In a container environment (e.g., where the orchestrator microservice 600-1 is a container and the participating microservice 600-2 is a service running in the container), the container can "just" re-initiate the service as the service has the context of its last failure within (e.g., as part of its attached data). Thus, the service can re-initiate with the context by taking the current input from the attached data and automatically starting from where it left off before failure (e.g., in the example above, with updating the employee details). Here, the service itself is intelligent using the attached data and the context of last failure.

Figure 7:
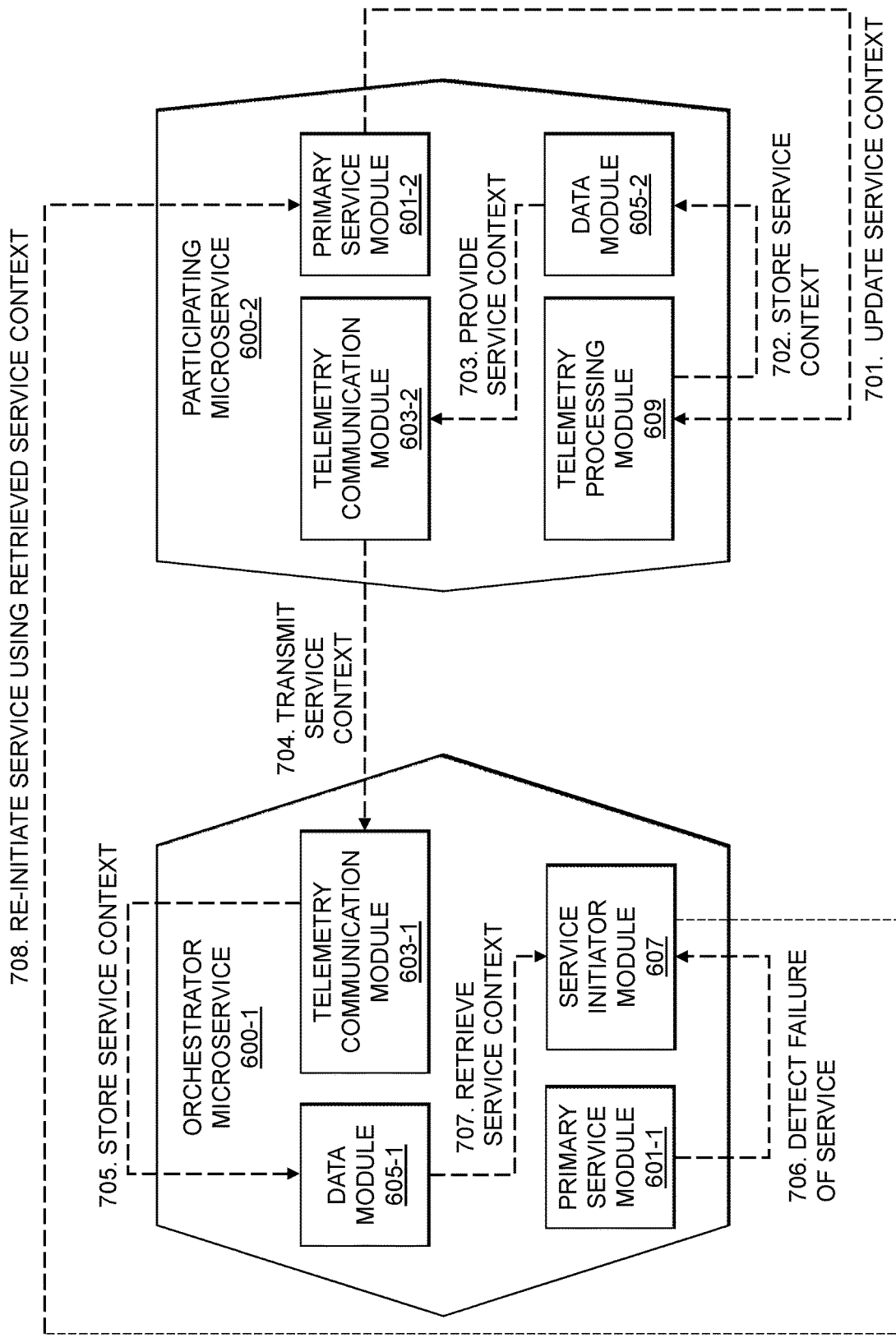
FIG. 7 shows a process flow for an orchestrator microservice to perform service re-initiation on a participating microservice in an illustrative embodiment.

FIG. 7 shows a process flow for the orchestrator microservice 600-1 to re-initiate a failed participating microservice 600-2. Prior to failure, the primary service module 601-2 of the participating microservice 600-2 is performing an assigned task (e.g., in the example employee microservice, updating the employee summary and updating the employee details). The primary service module 601-2 will update service context in step 701 with the telemetry processing module 609. Step 701 may be performed periodically (e.g., each time a "heartbeat" message is to be transmitted to the orchestrator microservice 600-1), whenever the primary service module 601-2 completes a "stage" of its assigned task (e.g., after updating the employee summary, after updating the employee details), in response to an explicit request, in response to detecting or predicting an error condition, in response to detecting or predicting failure of the participating microservice 600-2, combinations thereof, etc. In step 702, the telemetry processing module 609 stores the service context in the data module 605-2 (e.g., in a .ser file store).

The data module 605-2 provides the service context to the telemetry communication module 603-2 in step 703, and the telemetry communication module 603-2 of the participating microservice 600-2 transmits its service context to the telemetry communication module 603-1 of the orchestrator microservice 600-1 in step 704. In some embodiments, steps 703 and 704 are performed periodically at regular intervals where the service context is transmitted in "heartbeat" messages sent from the participating microservice 600-2 to the orchestrator microservice 600-1. It should be noted that, if there is no update to the service context of the participating microservice 600-2 between heartbeat messages, the service context is not required to be transmitted again (e.g., to save bandwidth). The telemetry communication module 603-1 of the orchestrator microservice 600-1 stores the service context of the participating microservice 600-2 in its data module 605-1 (e.g., in a .ser file store).

The primary service module 601-1 of the orchestrator microservice 600-1 is assumed to detect failure of the participating microservice 600-2 in step 706. Such failure may be detected if the participating microservice 600-2 misses some designated number of heartbeat messages in a specified period of time (e.g., such as missing a single heartbeat message, missing two or more consecutive heartbeat messages, etc.). On detecting failure of the participating microservice 600-2 in step 706, the primary service module 601-1 of the orchestrator microservice 600-1 directs the service initiator module 607 to re-initiate the participating microservice 600-2. The service initiator module 607 of the orchestrator microservice 600-1 then retrieves the service context of the participating microservice 600-2 from the data module 605-1 in step 707. In step 708, the service initiator module 607 of the orchestrator microservice 600-1 re-initiates the participating microservice 600-2 using the retrieved service context.

Example implementations of an orchestrator microservice (e.g., orchestrator microservice 600-1) and a participating microservice (e.g., participating microservice 600-2) will now be described. In this example, the orchestrator microservice is built using Spring Boot annotations. This may be taken to the framework, so that the user can keep existing annotations for telemetry (e.g., to implement telemetry communication modules 603-1 and 603-2). For telemetry, attached data (e.g., to implement data modules 605-1 and 605-2) is mandatory, and for the attached data the "side car" (e.g., to implement telemetry processing module 607 and service initiator module 609) is needed. In the orchestrator, the different participating microservices are defined and marked as "stages."

The communication between the modules (e.g., primary service modules 601-1 and 601-2, telemetry communication modules 603-1 and 603-2, data modules 605-1 and 605-2, telemetry processing module 607 and service initiator module 609) is as follows. The primary service modules 601-1 and 601-2 may be used for implementing tasks (e.g., business tasks where developers will write the code). Continuing with the example above, the employee microservice performs tasks of updating employee summary and employee details. Assume that the employee microservice errors out when updating the employee details (e.g., the employee summary is successfully inserted or updated). Thus, the employee microservice may log an error code (e.g., code 500). The "side car" of the employee microservice (e.g., the telemetry processing module 609 of the participating microservice 600-2) will read the error code, and construct context information including the input, error code and stage. This is then persisted in the attached data store (e.g., data module 605-2) of the employee microservice. A telemetry sender of the employee microservice (e.g., telemetry communication module 603-2) reads the message and telemetry to the orchestrator microservice. This illustratively acts as a built-in "heartbeat" between the orchestrator and employee microservice. The orchestrator microservice telemetry receiver (e.g., telemetry communication module 603-1) receives the message and keeps it in its attached data store (e.g., data module 605-1). When the orchestrator microservice re-initiates the employee microservice (or retries a current request), it reads the context information from its attached data store for the error code and state, and re-initiates the employee microservice with the stored context (e.g., using service initiator module 607). The employee microservice, when re-executed, will skip the employee summary update (as this was successfully completed prior to failure, as indicated in the transmitted context information) and only runs the employee details update.

In an implementation, the telemetry communication annotation (e.g., for implementing telemetry communications modules 603-1 and 603-2) may be part of a framework. In the description below, such annotations are described for a Spring Boot implementation. Custom annotations may be utilized, such as @EnableAttachData (e.g., which will enable the port to read/write to the embedded file system in a .ser format in comma separated values) and @EnableTelemetryCommunication (e.g., which will enable opening the socket for sending data and the socket server for listening to other microservices using a range of ports defined in configuration files). Similarly, an annotation @EnableTelemetryProcessing may be utilized for functions of the telemetry processing module 609 (for a participating microservice) or the service initiator module 607 (for an orchestrator microservice).

Figure 10:
FIG. 10 shows pseudocode for establishing a communication channel between an orchestrator microservice and a participating microservice in an illustrative embodiment.

FIG. 8 shows pseudocode 800 for microservice initiation using the above-described annotations. Again, it should be noted that while pseudocode is shown using the custom annotations described above, the functionality of the various modules of orchestrator and participating microservices may also be implemented within the microservices framework (e.g., an Istio framework). FIG. 9 shows pseudocode 900 for the custom annotations. The @EnableTelemetryCommunication annotation will now be further considered. As described above, the @EnableTelemetryCommunication annotation is configured to listen for and send messages to other microservices. Each microservice with the @EnableTelemetryCommunication annotation will open a server socket with a unique port number. All instances of the microservice will use the same port to receive messages. FIG. 10 shows pseudocode 1000 for the orchestrator microservice to open a unique port 10012. Here, the orchestrator microservice listens on port 10012 (e.g., which is configurable in an associated .yaml file) for messages from the participating microservices. Once such messages (e.g., heartbeats) are received, the associated context information will be stored in an attached data store using port 10050.

Figure 11:
FIG. 11 shows pseudocode for a participating microservice to store status information in an illustrative embodiment.

Functionality of the primary service, attached data and telemetry processing and communication for the participating microservice will now be described, again with respect to the example employee microservice. On failure of the employee microservice, the "side car" (e.g., telemetry processing module 609) will insert context data in the attached data store (e.g., data module 605-2). The context data, in some embodiments, is stored using a JSON format. The context data will then be communicated in a message to the orchestrator microservice (e.g., using telemetry communication module 603-2) on port 10012 where the orchestrator microservice's associated telemetry module (e.g., telemetry communication module 603-1) will be listening. FIG. 11 shows pseudocode 1100 for such messaging. The orchestrator microservice is thus made aware of the context of the failure of the employee microservice (e.g., that the employee summary is inserted but the employee details were not). Thus, when the orchestrator microservice re-executes the same task (e.g., using service initiator module 607), the re-initiated employee microservice will start with updating employee details. Similarly, the container re-initiation after service failure will be re-instantiated from the updating employee details task or stage. FIG. 12 shows an example configuration file 1200 (e.g., an application .yaml file) for the orchestrator or participating microservice.

The techniques described herein advantageously enable context-aware initiation of microservices, using attached data and new re-initiation logic that uses the last failure context. Thus, when re-initiating a microservice, the techniques described herein avoid the overhead of clearing the data proliferation due to microservice instance failure, and avoid restarting a task from its first step (when one or more steps or stages were successfully completed prior to failure). Further, the techniques described herein enable inter-microservice telemetry for microservices environments. In conventional microservices environments, communication between microservices is only actual microservice calls as there is no telemetry of microservice data or context transmitted between microservices. Illustrative embodiments enable built-in "heartbeat" or other messages between orchestrator and participating microservices to include such telemetry data (e.g., microservice context information).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for context-based intelligent re-initiation of microservices will now be described in greater detail with reference to FIGS. 13 and 14. Although described in the context of system 100, these platforms may also be used to implement at least portions of other information processing systems in other embodiments.

Figure 13:
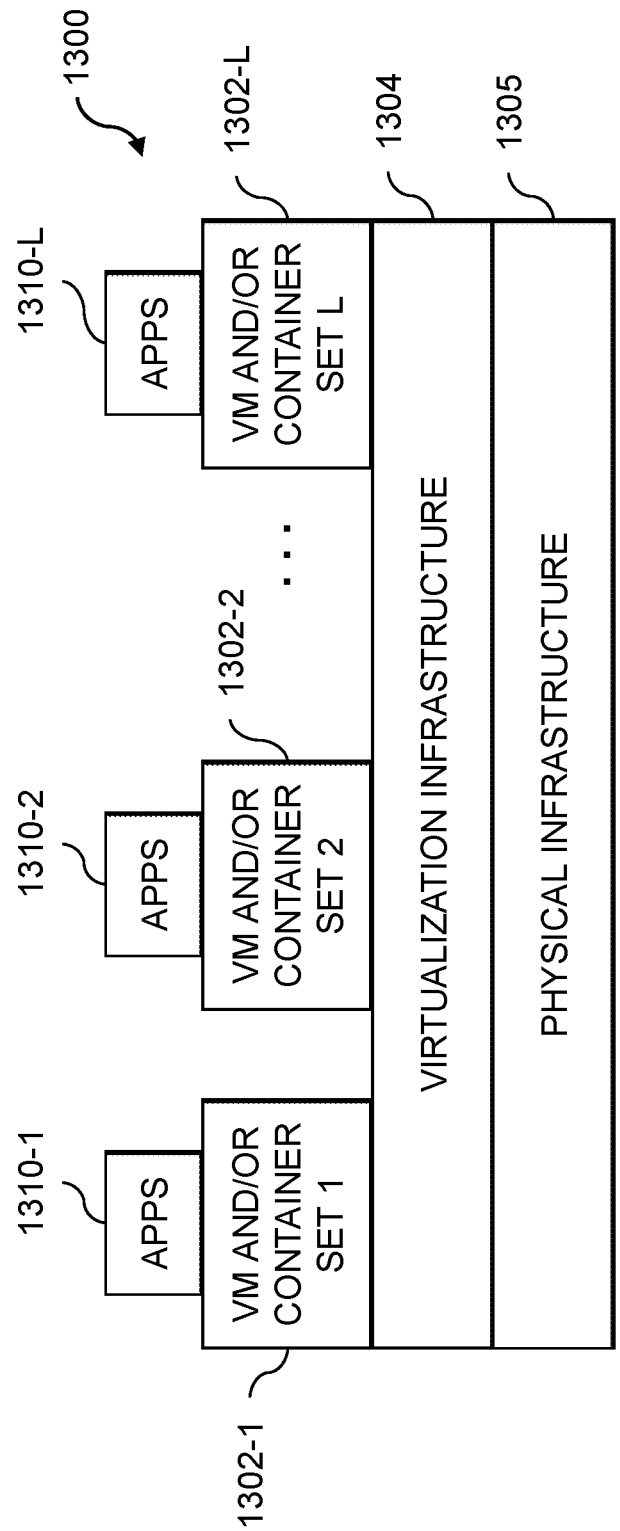
FIGS. 13 and 14 show examples of processing platforms that may be utilized to implement at least a portion of an information processing system in illustrative embodiments.
Figure 14:
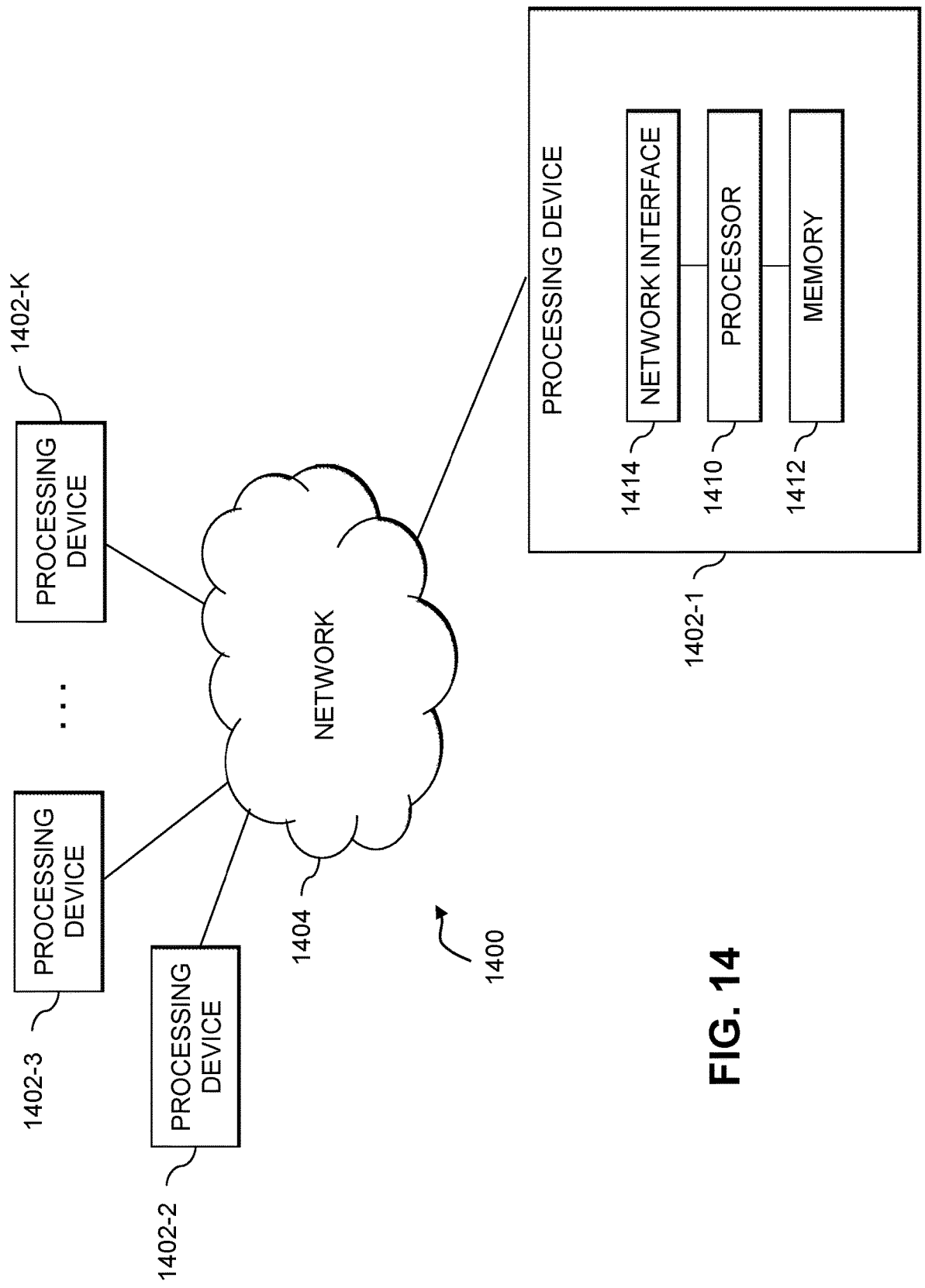

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, ... 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, ... 1310-L running on respective ones of the VMs/container sets 1302-1, 1302-2, ... 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, ... 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for context-based intelligent re-initiation of microservices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, container environments, microservices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      receiving, at a first microservice, context information for a second microservice, the context information characterizing a current state of execution of one or more tasks by the second microservice;
      detecting, by the first microservice, failure of the second microservice; and
      re-initiating, by the first microservice, the second microservice utilizing the received context information for the second microservice;
   wherein re-initiating the second microservice utilizing the received context information for the second microservice enables the re-initiated second microservice to continue execution of the one or more tasks from the current state.

2. The apparatus of claim 1 wherein the first microservice comprises an orchestrator microservice of a container environment.

3. The apparatus of claim 1 wherein the second microservice comprises one of a set of two or more participating microservices in a microservices execution chain in the container environment.

4. The apparatus of claim 1 wherein the first microservice comprises an attached data store, the at least one processing device being further configured to perform the step of storing the context information for the second microservice in the attached data store.

5. The apparatus of claim 4 wherein the context information for the second microservice is stored in the attached data store as a serialized object file.

6. The apparatus of claim 5 wherein the serialized object file utilizes a JavaScript Object Notation (JSON) format.

7. The apparatus of claim 4 wherein the first microservice is configured:
   to implement a listener on at least a first port for receiving context information from the second microservice; and
   to implement a sender on at least a second port for posting the context information received from the second microservice to the attached data store.

8. The apparatus of claim 4 wherein the attached data store comprises an embedded file system of the first microservice, the context information for the second microservice being stored in the attached data store in a serialized data format in one or more comma separated values.

9. The apparatus of claim 1 wherein the context information for the second microservice comprises:
   input data for the one or more tasks to be executed by the second microservice;
   a given one of two or more stages at which execution of the second microservice failed; and
   an error code indicating a type of failure of the second microservice.

10. The apparatus of claim 1 wherein the context information for the second microservice is received as part of a given heartbeat message sent from the second microservice to the first microservice.

11. The apparatus of claim 1 wherein the one or more tasks of the second microservice are executed in two or more stages in a designated order, and wherein the context information characterizing the current state of execution of the one or more tasks by the second microservice comprises an indication of a most recent one of the two or more stages successfully executed by the second microservice.

12. The apparatus of claim 11 wherein re-initiating the second microservice utilizing the received context information for the second microservice enables the re-initiated second microservice to continue execution of the one or more tasks from a given one of the two or more stages following the most recent one of the two or more stages successfully executed by the second microservice.

13. The apparatus of claim 1 wherein the second microservice is implemented within a given software container instance.

14. The apparatus of claim 13 wherein detecting failure of the second microservice comprises detecting failure of the given software container instance, and wherein re-initiating the second microservice utilizing the received context information for the second microservice comprises re-initializing the given software container instance.

15. A computer program product comprising a non-transitory processor-readable storage medium having stored therein program code of one or more software programs, wherein the program code when executed by at least one processing device causes the at least one processing device to perform steps of:
   receiving, at a first microservice, context information for a second microservice, the context information characterizing a current state of execution of one or more tasks by the second microservice;
   detecting, by the first microservice, failure of the second microservice; and
   re-initiating, by the first microservice, the second microservice utilizing the received context information for the second microservice;

wherein re-initiating the second microservice utilizing the received context information for the second microservice enables the re-initiated second microservice to continue execution of the one or more tasks from the current state.

16. The computer program product of claim 15 wherein the first microservice comprises an orchestrator microservice of a container environment, and wherein the second microservice comprises one of a set of two or more participating microservices in a microservices execution chain in the container environment.

17. The computer program product of claim 15 wherein the first microservice comprises an attached data store, wherein the program code when executed by the at least one processing device is further configured to perform the step of storing the context information for the second microservice in the attached data store, and wherein the context information for the second microservice is stored in the attached data store as a serialized object file.

18. A method comprising:
   receiving, at a first microservice, context information for a second microservice, the context information characterizing a current state of execution of one or more tasks by the second microservice;
   detecting, by the first microservice, failure of the second microservice; and
   re-initiating, by the first microservice, the second microservice utilizing the received context information for the second microservice;
   wherein re-initiating the second microservice utilizing the received context information for the second microservice enables the re-initiated second microservice to continue execution of the one or more tasks from the current state; and
   wherein the method is performed by at least one processing device comprising a processor coupled to a memory.

19. The method of claim 18 wherein the first microservice comprises an orchestrator microservice of a container environment, and wherein the second microservice comprises one of a set of two or more participating microservices in a microservices execution chain in the container environment.

20. The method of claim 18 wherein the first microservice comprises an attached data store, wherein the method further comprises storing the context information for the second microservice in the attached data store, and wherein the context information for the second microservice is stored in the attached data store as a serialized object file.

\* \* \* \* \*